United States Patent [19]
Walters et al.

[11] Patent Number: 5,778,130
[45] Date of Patent: Jul. 7, 1998

[54] OPTICAL FIBER CONNECTOR HOUSING

[75] Inventors: Mark D. Walters, Colleyville; Kevin L. Morgan, Paradise, both of Tex.

[73] Assignee: Siecor Corporation, Hickory, N.C.

[21] Appl. No.: 777,227

[22] Filed: Dec. 31, 1996

[51] Int. Cl.[6] ................................................ G02B 6/36
[52] U.S. Cl. ........................................................ 385/134
[58] Field of Search ................................. 385/134, 135

[56] References Cited

U.S. PATENT DOCUMENTS

| | | | |
|---|---|---|---|
| Re. 34,955 | 5/1995 | Anton et al. | 385/53 |
| 4,630,886 | 12/1986 | Lauriello et al. | 350/96.2 |
| 4,708,430 | 11/1987 | Donaldson et al. | 350/96.2 |
| 4,824,196 | 4/1989 | Bylander | 350/96.2 |
| 4,911,662 | 3/1990 | Debortoli et al. | 439/719 |
| 4,971,421 | 11/1990 | Ori | 350/96.2 |
| 5,093,885 | 3/1992 | Anton | 385/134 |
| 5,100,221 | 3/1992 | Carney et al. | 385/135 |
| 5,129,030 | 7/1992 | Petrunia | 385/135 |
| 5,179,618 | 1/1993 | Anton | 385/136 |
| 5,339,379 | 8/1994 | Kutsch et al. | 385/135 |
| 5,363,465 | 11/1994 | Korkowski et al. | 385/135 |
| 5,402,515 | 3/1995 | Vidacovich et al. | 385/135 |
| 5,442,726 | 8/1995 | Howard et al. | 385/135 |

Primary Examiner—John Ngo

[57] ABSTRACT

An optical fiber connector housing or facilitating the cross-connection or interconnection of optical fibers is provided having upper and lower plate members spaced apart from one another with the front edge of the lower plate member extending further forward than the front edge of the upper plate member. A connecter panel depends generally vertically downward from the front edge of the upper plate member thereby defining a shelf portion at the forward part of the lower plate member. A door is hingeably connected to the front edge of the lower plate member thereby defining a forward cable area, at least one side aperture, and at least one top aperture forward of the connector panel.

11 Claims, 3 Drawing Sheets

5,778,130

1

OPTICAL FIBER CONNECTOR HOUSING

TECHNICAL FIELD OF THE INVENTION

This invention relates to an optical fiber connection housing used to cross-connect and interconnect optical fibers.

BACKKGROUND OF THE INVENTION

Optical fibers are increasingly preferred over copper wires for the transmission of telecommunication signals and other data. Once used only in specialized, highdensity applications, optical fiber networks are increasingly being utilized in the so called "premises market" to provide signal transmission between groups of nearby buildings, such as a university or business campus, and even for intrabuilding connections of telephone systems, computer networks, and other such office systems.

Compared to conventional copper wiring, the physical routing of optical fibers, known as "cable management" is an area of significant concern in designing optical fiber equipment, due primarily to signal losses, fracturing, or breakage which can occur when an optical fiber is bent too sharply. Each fiber has a "minimum bend radius" which may not be exceeded without risking signal loss or other damage to the fiber. In addition, the fibers may be damaged if they are subjected to excessive tension or physical impact from external sources.

Optical fiber connection apparatus, also known as distribution frames or "patch panels", are used wherever the interconnection or cross-connection of multiple optical fibers is required, such as where a optical fiber cable comprising numerous individual fibers enters a building for connection to the individual optical fibers of the building's computer network. Due to space limitations in many buildings, it is desirable that the connection apparatus allow for the interconnection of a large number of individual fibers in as small a space as possible, thus requiring a high "density" of connections. It is also desirable to make the work of technicians installing and servicing the connection apparatus and associated optical fibers as simple as possible. Many patch panels are simply an open planar array of fiber optic adaptors, each of which allows the interconnection of two optical fibers by plugging specially tailored connector terminals (also known simply as connectors) into opposite ends of the adapter. The fibers can then be routed out the top, bottom and sides of the panel (usually into a horizontal trough or "raceway") thus allowing a large number of connectors to fit into a smaller patch panel without the routing and tracing of individual fibers becoming too difficult for the technician. It is, however, also necessary that the connection apparatus protect the fibers and connectors from damage due to excessive bending, excessive tension, or physical damage from the external environment, such as, for example, someone passing by the equipment with a ladder which could crush or snag unprotected fibers or connectors. A number of optical fiber cross-connect units are known in the prior art which attempt to address the problems just outlined through the use of protective shrouds or doors. Examples of this prior art may be found in U.S. Pat. Nos. 5,129,030, 4,708,430 and 4,630,886. While these apparatus provide some protection to the connectors and fibers, the fibers may then typically be routed only through the top and bottom of the unit or only through slots in the side of the unit. Density is therefore sacrificed to gain protection of the connectors and fibers.

As the prior art demonstrates, it has become problematic to address the multiple needs of an optical fiber interconnect device such as achieving high connection density, allowing access to the front of the connection panel for installation and maintenance activities, protecting the fibers and connectors from excessive bending, excessive tension, and mechanical damage from external sources, while, at the same time, giving an installer a range of options for cable routing from the front of the connection panel so as to facilitate the "tracing" of individual optical fibers and their removal or addition from the cable array. A need therefore exists, for an optical fiber connection housing which provides high connection density, complete access to the front of the connection panel, protection to the fibers and connectors from excessive bending, stress and external damage, while at the same time giving an installer a range of options for routing cables from the front of the connector panel.

SUMMARY OF THE INVENTION

In accordance with one aspect of the invention a connector housing is provided that comprises a housing having at least one connector panel portion for holding an array of connectors. The connector panel portion is generally rectilinear with four sides. A door is attached to the housing and spaced from and parallel with the connector panel portion. The door is spaced from the housing substantially along at least three sides of the connector panel portion so as to allow cables that are connected to the connector panel portion between the door and the connector panel portion to be routed away from at least three sides of the connector panel portion. As such, the present invention provides for both the protection of the fibers and the versalitity of routing cables from three sides of the connector panel.

In accordance with another aspect of the present invention an optical fiber connector housing is provided for facilitating the cross-connection of optical fibers terminated with connectors and having a minimum bend radius. The housing includes upper and lower plate members, a connector panel, a door, and a means for releasably securing the door in a closed position. The upper and lower plate members are generally horizontal and space apart from one another, with the front edge of the lower plate member extending further forward than the front edge of the upper plate member. The connector panel depends generally vertically downward from the front edge of the upper plate member and connects to the lower plate member along an attachment line which is rearwardly disposed with respect to the front edge of the lower plate member, thereby defining a shelf portion of the lower plate member. The connector panel has a front face and a rear face and is adapted for mounting therethrough a plurality of optical fiber adaptors adapted for receiving and mounting an optical alignment a pair of optical fibers routed to opposite sides of the adaptor and each being terminated with a connector. The door is hingeably connected to the front edge of the lower plate member and is thereby movable between an open position and a closed position. When in the closed position, the door has a generally vertical orientation and is vertically aligned with the connector panel thereby defining a forward cable area, at least one side aperture, and at least one top aperture. When the door is in the closed position, a plurality of optical fibers connected to the front side of the connector panel can be advantageously routed out of the forward cable area by routing a first portion of the plurality of fibers through at least one side aperture and routing a second portion of the plurality of fibers through at least one top aperture, thereby reducing the density of the cables routed in each direction while the door protects the connectors and optical fibers in the forward cable area from damage and maintains the minimum required bend radius of the optical fibers.

In accordance with another aspect of the present invention, the door is selectively detachable from the lower plate member when in the open position thereby allowing unrestricted access to the forward cable area.

In accordance with another aspect of the present invention, the door comprises a transparent material allowing visual inspection of the optical fiber cables, connectors, and adaptors in the forward cable area when the door is in the closed position.

In accordance with another aspect of the current invention, the means for securing the door comprises a bracket extending from the connector panel and releasably inter-fitting with a latch mechanism mounted on the door.

In accordance with another aspect of the current invention, side plate members are provided which are connected between the upper plate member and the rear portion of the lower plate member thereby defining a rear cable area. The rear cable area is bounded by the upper plate, the rear portion of the lower plate, the side plates, and the rear face of the connector plate. A rear plate member can be provided which can be connected to a rear portion of the housing to fully enclose the rear cable area.

BRIEF DESCRIPTION OF THE DRAWINGS

A more complete understanding of the invention and it's advantages will be apparent from the following detailed description when taken in conjunction with the accompanying drawings in which.

DETAILED DESCRIPTION

Figure 1:
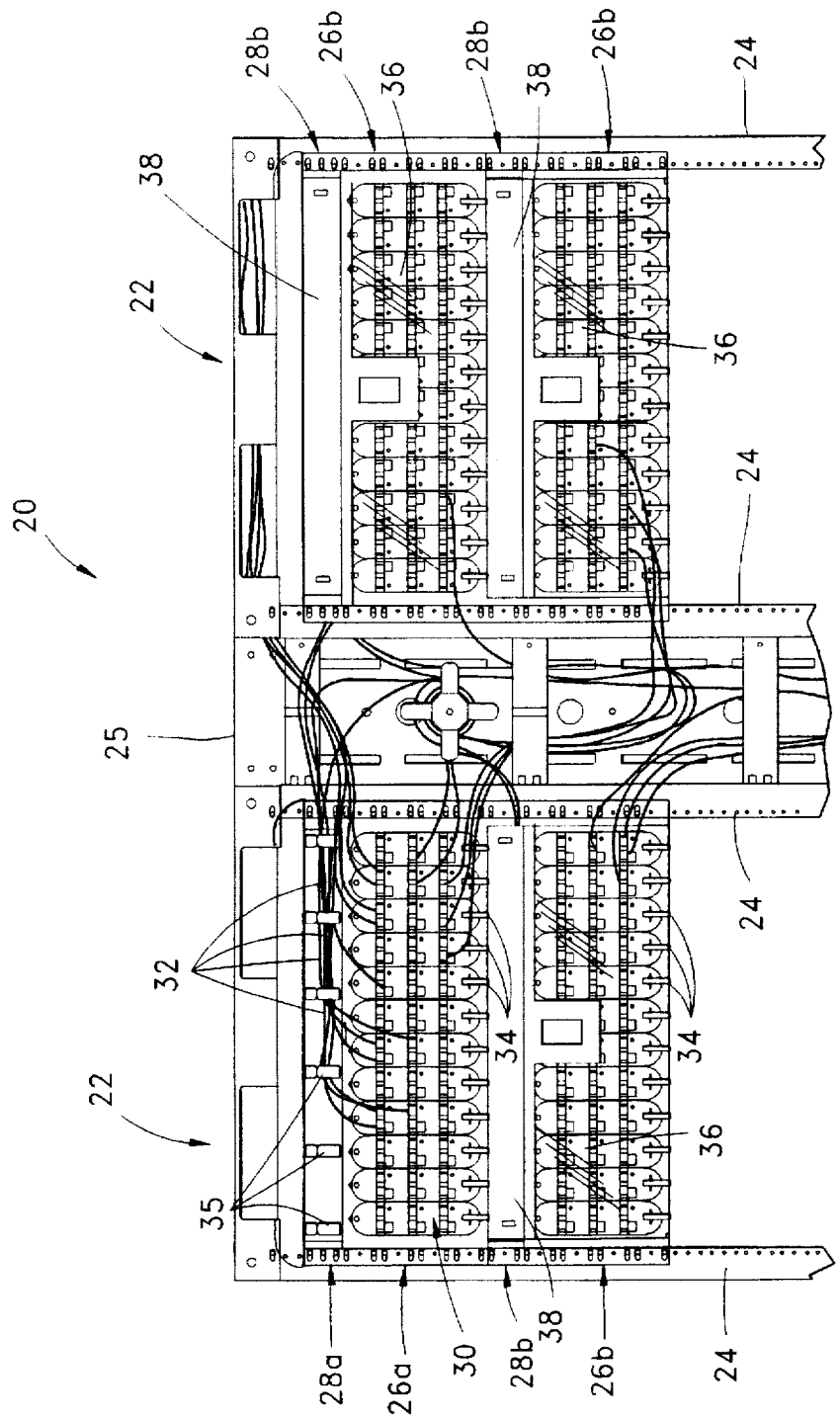
FIG. 1 is a generalized front view of an optical fiber distribution facility including an optical fiber connector housing according to one embodiment of the present invention.

Referring now to the drawings, wherein like reference characters designate like or corresponding parts throughout several views, an optical fiber connector housing forming one embodiment in the present invention is illustrated. Referring first to FIG. 1, a front view of a fiber optic distribution center 20 is shown which can incorporate a optical fiber connector housing according to the current invention. The typical distribution center 20 comprises one or more vertical equipment stacks 22, also known as "bays", each comprising several components supported by vertical frame members 24. The frame members 24 may be attached to a wall or free standing on the floor. The distribution facility shown in FIG. 1 comprises two equipment bays 22, however it will be readily apparent that the numbers of bays to be used will be dependant on the number of connections required in the distribution facility. When multiple adjacent bays are used as shown in FIG. 1, an interbay storage unit 25 may be positioned between bays 22 to further aid in cable management.

Referring still to FIG. 1, each equipment bay 22 typically includes at least one optical fiber connector housing 26 and at least one horizontal raceway 28 positioned above and adjacent each connector housing 26. In the distribution facility shown in FIG. 1, each equipment bay 22 has two connector housings 26 and two horizontal raceways 28. It should be noted, however, that while it is preferred to use horizontal raceways 28 in conjunction with connector housings 26, the use of horizontal raceways is optional, and connector housings 26 may be used alone or in conjunction with other equipment depending on the needs of the user. In addition, splice housings (not shown) and other equipment may be included in the equipment bays 22 as dictated by the needs of the user.

As best seen in the connector panel marked 26a (which has the door removed for purposes of the illustration) each connector housing 26 includes a connector panel 30 for interconnecting individual optical fibers 32 at the front side of connector panel 30 to other optical fibers (not shown) at the rear side of connector panel 30. Connector housing 26 can further include cable management brackets 34 positioned below the connector panel to facilitate in the routing of optical fibers 32 toward the side of connector housing 26.

As best seen in the horizontal raceway marked 28a (which has a front cover removed for the purposes of illustration), each horizontal raceway 28 can also include cable management brackets 36 to facilitate the routing of optical fibers 32 from connector panel 30 through the top of the connector housing 26. The optical fibers 32 from each connector housing 26 can then be routed via the horizontal raceways 28 and the interbay storage unit 25 to other connector housings 26 in the distribution facility 20 or to optical cables for interconnection with other parts of the user's facility.

After installation or maintenance of the optical fibers, a door 36 (best seen on housings marked 26b) is shut over the forward cable area of each connector housing 26 to protect the fibers and connectors from damage due to excessive bending, excessive tension, or physical damage from the external environment. Similarly, protective covers 38 can be affixed on horizontal raceways 28 (best seen in horizontal raceways marked 28b) to further protect the optical fibers routed therethrough.

Figure 2:
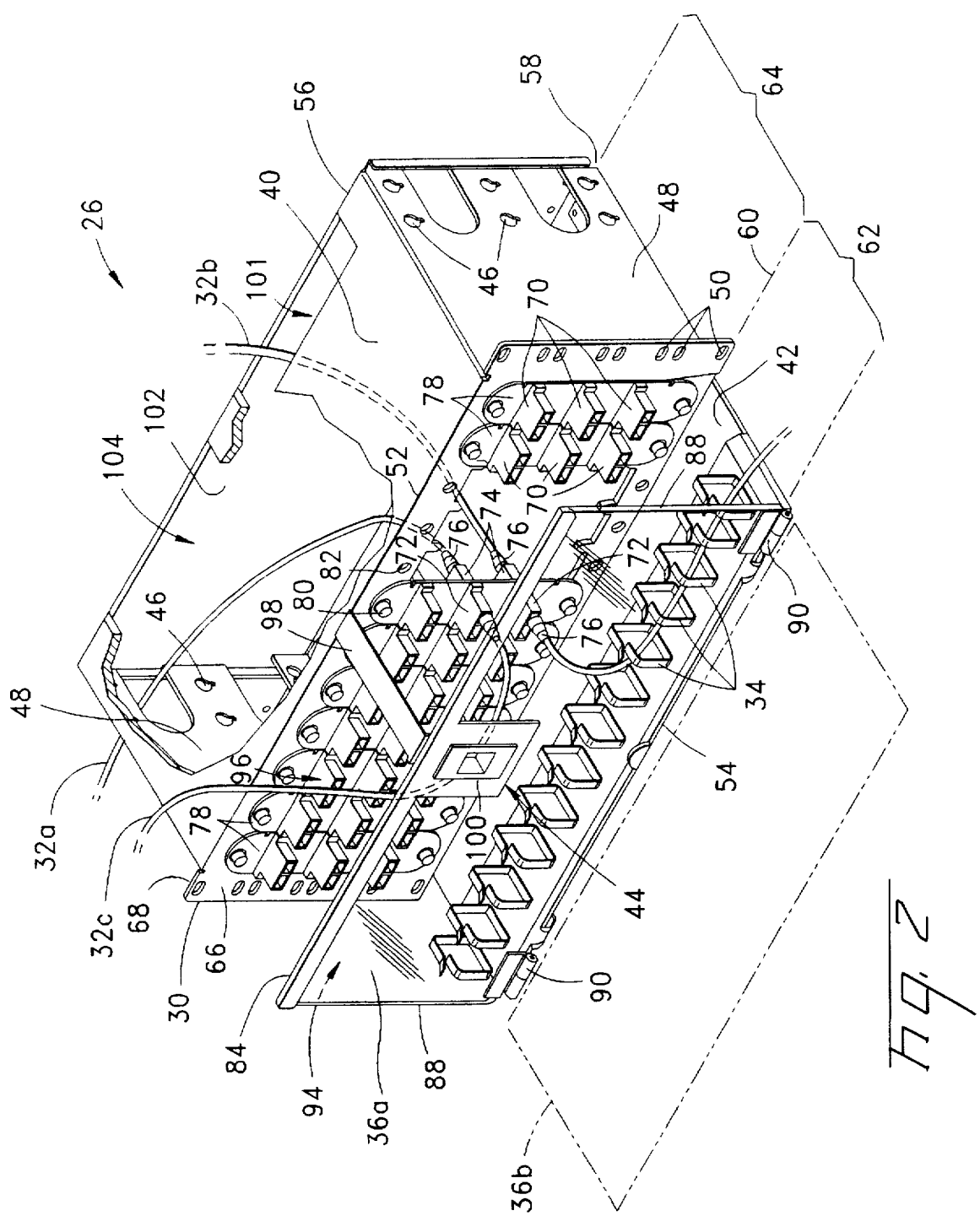
FIG. 2 is a perspective view, with some portions broken away, of an optical fiber connector housing according to one aspect of the present invention.

Referring now to FIG. 2, a front perspective view of an optical fiber connector housing 26 according to one embodiment of the current invention is shown. Connector housing 26 comprises upper and lower plate members 40, 42, respectively, a connector panel 30, a door 36, and a means 44 for releasably securing the door 36 in a closed position. Upper and lower plate members 40, 42 are generally horizontal and spaced apart from one another. The plate members 40, 42 are adapted for attachment to a supporting frame. In the embodiment shown in FIG. 2, the upper and lower plate members 40, 42 can be attached to the supporting frame (not shown) by means of mounting holes 46 formed in the side plates 48 connected between the plate members 40 and 42, by mounting holes 50 formed in connector panel 30 connected to plate members 40, 42, or by other means of connection known in the art. Upper and lower plate members 40, 42 each have front edges 52, 54, respectively, and rear edges 56, 58, respectively, with the front edge 54 of the lower plate member 42 extending further forward than the front edge 52 of the upper plate member 40.

The connector panel 30 depends generally vertically downward from the front edge 52 of the upper plate member 40 and is connected to the lower plate member 42 along an attachment line 60 which is rearwardly disposed with respect to the front edge 54 of the lower plate member 42, thereby defining a shelf portion 62 and a rear portion 64 of the lower plate member 42. The shelf portion 62 of lower plate member 42 is between the front edge 54 of the lower plate member 42 and the attachment line 60 and the rear portion 64 of the lower plate member 42 is between the attachment line 60 and the rear edge 58 of the lower plate member 42.

Connector panel 30 has a front face 66 and a rear face 68 and is adapted for mounting therethrough a plurality of optical fiber adaptors 70 of the type wherein each adaptor has a front side 72 and a rear side 74 and is adapted for receiving and mounting in optical alignment a pair of optical fibers 32 being routed to opposite sides of the adaptor 70 and each being terminated with a connector 76. Such optical fiber adaptors and connectors are well known in the art and are available in a variety of configurations.

In the embodiment shown in FIG. 2, the connector panel 30 is adapted for mounting a plurality of connector modules 78 each including three duplex optical fiber adaptors 70, thus allowing each module 78 to accommodate six optical fiber connections. Each connector module 78 is mounted to the connector panel 30 by means of quick release fasteners 80 which are inserted into mounting holes 82 on connector panel 30. In the embodiment shown in FIG. 2, the connector panel 30 can mount up to 12 connector modules 78 for providing a total of 72 optical fiber connections, however, three connector modules have been removed in FIG. 2 for the purposes of illustration so that connections on the rear side of connector panel 30 can be seen.

Figure 3:
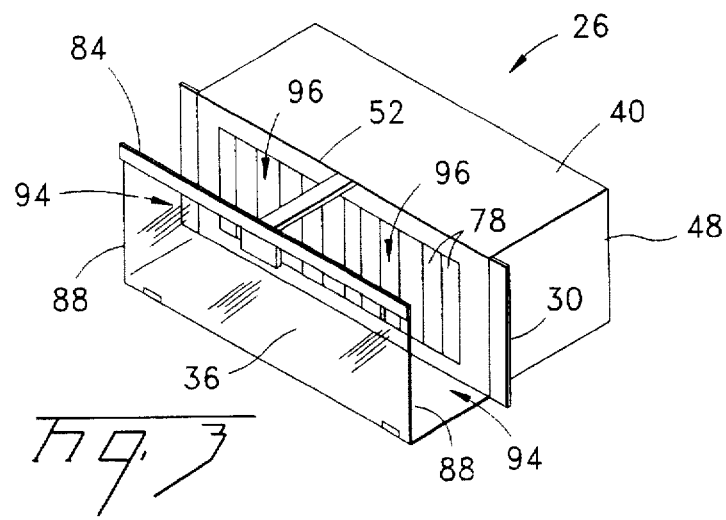
FIG. 3 is a simplified perspective view, similar to FIG. 2, showing the side and top aperatures of a connector housing according to one embodiment of the present invention.

The door 36 has top and bottom edges 84 and 86, respectively, and side edges 88. The door 36 is hingeably connected at the bottom edge 86 to the front edge 54 of the lower plate member 42 and is thereby moveable between a closed position (shown as 36a) and an open position (shown as 36b in phantom). In the embodiment shown in FIG. 2, two hinges 90 are used for connection of door 36 to lower plate member 42. Referring now also to FIG. 3, when in the closed position, the door 36 has a generally vertically orientation and is spaced from and generally parallel with the connector panel 30, thereby defining a forward cable area 92, at least one side aperture 94, and at least one top aperture 96. The forward cable area 92 is bounded by the door 36, the front face 66 of the connector panel 30, and the shelf portion 62 of the lower plate member 42. The side aperture 94 is defined as being between the side edge 88 of the door 36 and the front face 66 of the connector panel 30. The top aperture 96 is defined as being between the top edge 84 of the door 36 and the front face 66 of the connector panel 30. When the door is in the open position (shown as 36b) the door 36 is not vertically oriented and vertically aligned with the connector panel 30, thereby allowing unrestricted access to the forward cable area 92.

A means 44 for releaseably securing the door 36 in the closed position is also provided. In the embodiment shown in FIG. 2, the securing means comprises a bracket 98 extending from connector panel 30 and releaseably interfitting with a latch mechanism 100 mounted on the door 36, however, it will be readily apparent that other mechanisms known in the art for holding the door 36 in the closed position could be substituted for the bracket and latch mechanism shown in FIG. 2 without departing from the scope of the invention, including other types of mechanical latches, magnetic latches, hook and loop material (such as Velcro®), and latches and hinges having mechanical detents. Further, while a hinged door 36 is preferred, in alternative embodiments of the current invention, a sliding door or a completely removable door or panel could be used as long as it can be vertically oriented and vertically aligned with the connector panel 30 when in the closed position.

Referring still to FIGS. 2 and 3, by employing an optical fiber connector housing 26 according to the current invention, a plurality of optic fibers 32 each being terminated with a connector 76 may be connected to the rear side 74 of adaptors 70 of connector panel 30. For example, the fiber marked 32a has been routed through side plate 48 and is connected to the middle adaptor of a connector module 78 while the optical fiber marked 32b has been routed through a slot 101 formed in the upper plate member 40 and is connected to the lower adaptor in the same connector module. To provide interconnections, a plurality of optical fibers 32 may be connected to the front side 72 of adaptors 70 on the connector panel 30 and advantageously routed out of the forward cable area 92 by routing a first portion of the plurality of fibers through at least one side aperture 94 and routing a second portion of the plurality of fibers through at least one top aperture 96. For example, in the embodiment shown in FIG. 2, the optical fiber marked 32c is connected to the front side 72 of the middle adaptor, thus interconnecting it with optical fiber 32a. Optical fiber 32c is then routed out of forward cable area 92 by means of top aperture 96. In a similar fashion, optical fiber 32d is connected to the front side 72 of the lower adaptor, thereby interconnecting it with optical fiber 32b. Optical fiber 32d is routed from forward cable area 92 by means of the cable management bracket 34 and the side aperture 94. For the purposes of clarity of illustration, FIG. 2 shows only two optical fibers 32 being connected and routed out of forward cable area 92, however, it will be readily apparent that the entire array of adaptors from connector panel 30 could be populated by optical fibers which could then be routed as necessary from forward cable area 92 out the side aperture 94 and out the top aperture 96 as determined by the installer. For example, referring again also to FIG. 1, optical fibers passing through top aperture 96 could be fed directly into an above adjacent horizontal raceway 28 while optical fibers exiting by way of the side aperture 94, could be routed directly to a interbay storage unit 25. A connector housing 26 according to the current invention allows the routing of optical fibers so as to reduce the density of fibers routed in each direction (i.e., vertically and laterally) while the closed door 36 protects the connectors 76, adaptors 70, and optical fibers 32 from damage and maintains the minimum required bend radius of the optical fibers.

In another embodiment of the current invention, the door 36 is selectively detachable from lower plate member 42 when the door is in the open position. This makes initial installation of the optical cables 32 easier for the technicians since the door does not get in the way. Once the initial installation is complete, the door 36 can be replaced so that the connectors 76 and optical fibers 32 are protected from damage. For this embodiment, any of the detachable hinge mechanisms known in the art may be used to allow the selective detachment of the door 36 from the lower plate 42.

In a preferred embodiment of the current invention, door 36 comprises a transparent material which allows visual inspection in the forward cable area 92 when the door 36 is in the closed position. Preferably, the transparent material is an impact-resistant plastic which provides breakage resistance as well as allowing inspection of the contents of the forward cable area, however, the transparent material of door 36 may also be a glass. When desired from the standpoint of attractive appearance or to protect personnel from the light radiation used in optical fibers, the transparent material of door 36 may be tinted or coated with other materials so as to affect light transmission therethrough.

In a further embodiment of the current invention, the optical fiber connector housing 26 may further comprise a rear plate member 102 connected to a rear portion of the housing to enclose a rear cable area 104. The rear cable area 104 is bounded by the upper plate 40, the rear portion 64 of the lower plate 42, side members 48, the rear face 68 of the connector panel 30, and by rear plate member 102, if used. The use of a rear plate member 102 to enclose the rear cable area 104 is optional; however, it helps protect the optical fibers on the rear side of the connector panel.

Figures 4A, 4B:
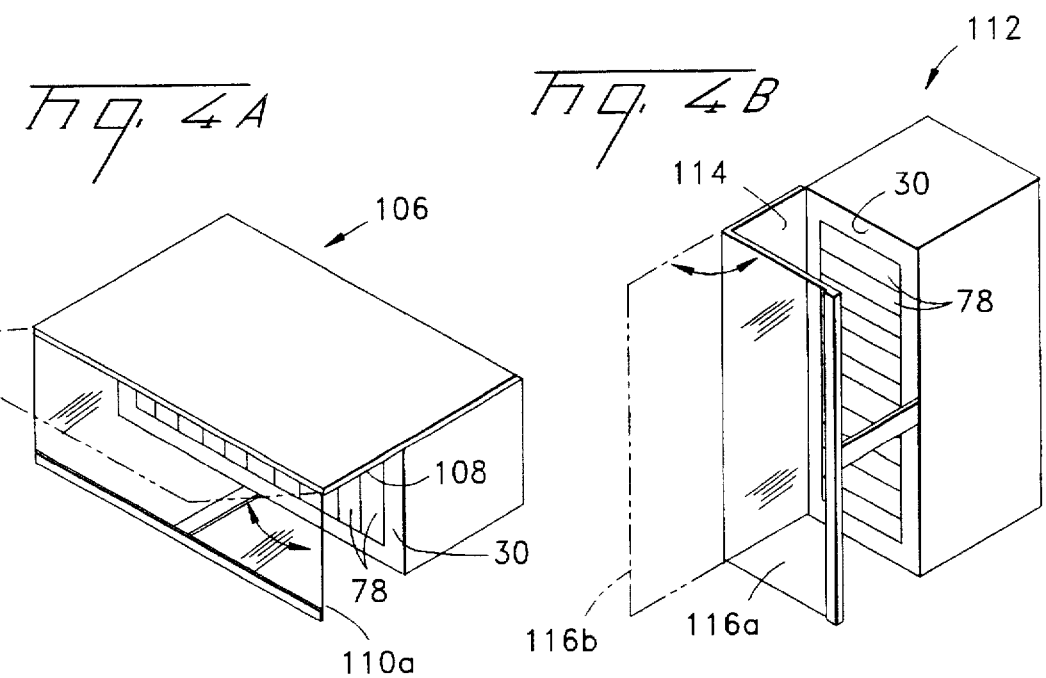
FIG. 4a is a simplified perspective view showing another embodiment of a connector housing according to the present invention.
FIG. 4b is a simplified perspective view showing still another embodiment of a connector housing according to the present invention.

While the embodiments previously described are preferred, it will be readily apparent that other embodiments exist within the scope of the current invention. Referring now to FIGS. 4A and 4B, it will be readily appreciated that essentially the same benefits may be obtained from an alternative connector housing 106 such as shown in FIG. 4A, which has been vertically "inverted", from the configuration shown in FIG. 2 such that the extending shelf section 108 of the connector housing is on the upper plate member rather than on the lower plate member and the door 110 opens towards the top rather than towards the bottom. Similarly, a second alternative connector housing 112 shown in FIG. 4B would have the extending shelf member 114 oriented vertically with the door 116 opening to the side as shown in FIG. 4B. It will be readily apparent that the use of these alternative embodiments such as shown in FIG. 4A and FIG. 4B would require the repositioning or reorientation of raceways or other equipment to derive the maximum benefit from the optical fiber routing options made available by the current invention.

Although several embodiments of the present invention have been illustrated in the accompanying drawings and described in the foregoing detailed description, it will be understood that the invention is not limited to the embodiments disclosed, but is capable of numerous rearrangements, modifications, and substitution of parts and elements without departing from the scope and spirit of the invention.

We claim:

1. An optical fiber connector housing for providing cross-connection functions for optical fibers terminated with connectors and having a minimum bend radius, said housing comprising:

(a) upper and lower plate members which are generally horizontal and spaced apart from one another;
said plate members being adapted for attachment to a supporting frame and each having front and rear edges;
the front edge of said lower plate member extending further forward than the front edge of said upper plate member;

(b) a connector panel depending generally vertically downward from the front edge of said upper plate member and connected to said lower plate member along an attachment line which is rearwardly disposed with respect to the front edge of said lower plate member, thereby defining a shelf portion and a rear portion of said lower plate member;
said shelf portion of said lower plate member being between the front edge of said lower plate member and said attachment line;
said rear portion of said lower plate member being between the attachment line and the rear edge of said lower plate member;
said connector panel having a front face and a rear face and being adapted for mounting a plurality of optical fiber adaptors therethrough wherein each said optical fiber adaptor has a front side and a rear side and is adapted for receiving and mounting in optical alignment a pair of optical fibers, said fibers being routed from opposite sides of said adaptor and each being terminated with a connector;

(c) a door having top, bottom and side edges;
said door being hingedly connected at the bottom edge to the front edge of said lower plate member and thereby movable between an open position and a closed position;
wherein, when in said closed condition, said door has a generally vertical orientation and is spaced from and parallel with said connector panel thereby defining a forward cable area, at least one side aperture, and at least one top aperture;
said forward cable area being bounded by said door, the front face of said connector panel, and the shelf portion of said lower plate member;
said side aperture being between the side edge of said door and the front face of said connector panel;
said top aperture being between the top edge of said door and the front face of said connector panel;
wherein, when in said open position, said door is not vertically oriented and vertically aligned with said connector panel, thereby allowing unrestricted access to said forward cable area; and (d) a means for releasably securing said door in said closed position;

whereby, when said door is in the closed position, a plurality of optical fibers each being terminated with a connector and connected to the front side of an adaptor on said connector panel can be advantageously routed out of said forward cable area by routing a first portion of said plurality of fibers through at least one side aperture and routing a second portion of said plurality of fibers through at least one top aperture, thereby reducing the density of the cables routed in each direction while said door protects said connectors and optical fibers in said forward cable area from damage and maintains the minimum required bend radius of the optical fibers.

2. The optical fiber connector housing of claim 1, wherein said door is selectively removable from said housing.

3. The optical fiber connector housing of claim 2, wherein said door comprises a transparent material allowing visual inspection of the optical fiber cables, connectors, and adaptors in said forward cable area when said door is in the closed position.

4. The optical fiber connector housing of claim 3, wherein said transparent material of said door significantly attenuates the transmission of light radiation at selected wavelengths.

5. The optical fiber connector housing of claim 3, wherein said transparent material is a plastic.

6. The optical fiber connector housing of claim 3, wherein said transparent material is a glass.

7. The optical fiber connector housing of claim 1, wherein said means for securing said door comprises a bracket extending from said connector panel and releasably interfitting with a latch mechanism mounted on said door.

8. The optical fiber connector housing of claim 1, further comprising cable management brackets mounted on said shelf portion of said lower plate member for releasably securing fiber optic cables routed from said adaptors through said side aperture.

9. The optical fiber connector housing of claim 1, further comprising side plate members connected between said upper plate member and said rear portion of said lower plate member thereby defining a rear cable area bounded by said upper plate, said rear portion of said lower plate, said side plates, and said rear face of said connector plate.

10. The optical fiber connector housing of claim 9, further comprising a rear plate member connected to a rear portion of said housing to enclose said rear cable area.

11. An optical fiber connector housing for providing cross-connection functions for optical fibers terminated with connectors and having a minimum bend radius, said housing comprising:

(a) first and second plate members which are generally parallel and spaced apart from one another;

said plate members being adapted for attachment to a supporting frame and each having front and rear edges;

the front edge of said second plate member extending further forward than the front edge of said first plate member;

(b) a connector panel connected to the front edge of said first plate member and connected to said second plate member along an attachment line which is rearwardly disposed with respect to the front edge of said second plate member, thereby defining a shelf portion and a rear portion of said second plate member;

said shelf portion of said second plate member being between the front edge of said second plate member and said attachment line;

said rear portion of said second plate member being between the attachment line and the rear edge of said second plate member;

said connector panel having a front face and a rear face and being adapted for mounting a plurality of optical fiber adaptors therethrough wherein each said optical fiber adapter has a front side and a rear side and is adapted for receiving and mounting in optical alignment a pair of optical fibers, said fibers being routed from opposite sides of said adapter and each being terminated with a connector;

(c) a generally rectangular door having two main edges oriented generally parallel to the front edge of said second plate member and two side edges connected between said main edges;

said door being releasably connectable to at least one of said plate member and said connector panel, and thereby being movable between an open position and a closed position;

wherein, when in said closed condition, said door is positioned with a first of said main edges adjacent the front edge of said second plate member, and said door is oriented parallel to and aligned with said connector panel, thereby defining a forward cable area, at least one side aperture, and at least one main aperture;

said forward cable area being bounded by said door, the front face of said connector panel, and the shelf portion of said second plate member;

said side aperture being between the said edge of said door and the front face of said connector panel;

said main aperture being between a second of said main edges of said door and the front face of said connector panel;

wherein, when in said open position, said door is not oriented parallel to and aligned with said connector panel, thereby allowing unrestricted access to said forward cable area; and (d) a means for releasably connecting said door to at least one of said plate members and said connector panel;

whereby, when said door is in the closed position, a plurality of optical fibers each being terminated with a connector and connected to the front side of an adaptor on said connector panel can be advantageously routed out of said forward cable area by routing a first portion of said plurality of fibers through at least one side aperture and routing a second portion of said plurality of fiber through at least one main aperture, thereby reducing the density of the cables routed in each direction while said door protects said connectors and optical fibers in said forward cable area from damage and maintains the minimum required bend radius of the optical fibers.

* * * * *